US012078536B2

(12) United States Patent
Weidmann

(10) Patent No.: US 12,078,536 B2
(45) Date of Patent: Sep. 3, 2024

(54) INFRARED SPECTROMETER

(71) Applicant: United Kingdom Research and Innovation, Swindon (GB)

(72) Inventor: Damien Weidmann, Oxfordshire (GB)

(73) Assignee: United Kingdom Research and Innovation, Swindon (GB)

( * ) Notice: Subject to any disclaimer, the term of this patent is extended or adjusted under 35 U.S.C. 154(b) by 465 days.

(21) Appl. No.: 17/423,312

(22) PCT Filed: Jan. 21, 2020

(86) PCT No.: PCT/GB2020/050127
§ 371 (c)(1),
(2) Date: Jul. 15, 2021

(87) PCT Pub. No.: WO2020/152454
PCT Pub. Date: Jul. 30, 2020

(65) Prior Publication Data
US 2022/0099489 A1 Mar. 31, 2022

(30) Foreign Application Priority Data

Jan. 21, 2019 (GB) ...................................... 1900796

(51) Int. Cl.
G01J 3/10 (2006.01)
G01N 21/3504 (2014.01)
(52) U.S. Cl.
CPC .......... G01J 3/108 (2013.01); G01N 21/3504 (2013.01)
(58) Field of Classification Search
CPC ........ G01J 3/108; G01J 3/0205; G01J 3/0208; G01J 3/021; G01J 3/0218; G01J 3/0256;
(Continued)

(56) References Cited

U.S. PATENT DOCUMENTS 6,815,012 B2 * 11/2004 Baumann ................. H02K 3/40
427/398.1
7,936,453 B2 * 5/2011 Logan, Jr. .................. G01J 3/42
356/326
(Continued)

FOREIGN PATENT DOCUMENTS

WO 2009101374 A1 8/2009
WO 2011058330 A1 5/2011
(Continued)

OTHER PUBLICATIONS

Abrams R. L. et al. "Resonator Theory for Hollow Waveguide Lasers" Applied Optics 1974 13 (9) pp. 2117-2125.
(Continued)

Primary Examiner — Edwin C Gunberg
Assistant Examiner — Gisselle M Gutierrez
(74) Attorney, Agent, or Firm — Lempia Summerfield Katz LLC

(57) ABSTRACT

There is described an infrared spectrometer having an optical circuit which comprises one or more hollow waveguides provided by elongate channels formed in a substrate. The optical circuit is arranged such that infrared light in the optical circuit acquires one or more spectral properties for detection by the spectrometer. A laser source couples laser light into an input hollow waveguide portion of the optical circuit, and an optical detector receives the light from an output hollow waveguide portion of the optical circuit, so that an analyser can determine said one or more spectral properties from the detected light.

37 Claims, 10 Drawing Sheets

(58) Field of Classification Search
CPC .... G01J 3/0291; G01J 3/18; G01J 3/26; G01J 3/42; G01J 3/433; G01J 3/443; G01J 3/4531; G01J 9/02; G01J 3/0259; G01N 21/3504; G01N 21/031; G01N 21/0332; G01N 2021/399; G01N 2201/0873; G01N 21/39; G01N 21/35; G02B 6/10; G02B 6/125; G02B 6/42
See application file for complete search history.

(56) References Cited

U.S. PATENT DOCUMENTS

| | | | | |
|---|---|---|---|---|
| 9,007,576 | B2* | 4/2015 | Lascola | B82Y 30/00 356/301 |
| 2008/0013877 | A1* | 1/2008 | Schmidt | G01N 21/0303 385/12 |
| 2010/0202734 | A1* | 8/2010 | DeCorby | G02B 6/1228 264/1.28 |
| 2011/0084047 | A1* | 4/2011 | Yeo | G02B 6/43 156/196 |
| 2013/0038869 | A1* | 2/2013 | Lascola | B82Y 20/00 977/773 |
| 2013/0081447 | A1* | 4/2013 | Carter | G01N 21/05 73/30.01 |
| 2013/0195456 | A1* | 8/2013 | Sorin | H04B 10/532 398/79 |
| 2014/0125983 | A1* | 5/2014 | Nitkowski | G01J 9/02 356/450 |
| 2014/0198814 | A1* | 7/2014 | Lee | H01S 5/0622 372/27 |
| 2015/0226665 | A1* | 8/2015 | Weidmann | G01J 3/42 356/437 |
| 2017/0363469 | A1* | 12/2017 | Sabry | G01J 3/0259 |
| 2019/0162883 | A1* | 5/2019 | Ko | G01J 3/0291 |
| 2020/0200952 | A1* | 6/2020 | Ko | G01J 3/0218 |
| 2020/0378892 | A1* | 12/2020 | Sabry | G01N 21/61 |
| 2023/0037387 | A1* | 2/2023 | Monpeurt | G02B 6/4203 |
| 2023/0324288 | A1* | 10/2023 | Boersma | G01N 21/031 356/409 |

FOREIGN PATENT DOCUMENTS

| | | |
|---|---|---|
| WO | 2014029971 A1 | 2/2014 |
| WO | 2014083348 A1 | 6/2014 |
| WO | 2014190331 A2 | 11/2014 |

OTHER PUBLICATIONS

Greetham G. M. et al., "Waveguide-enhanced 2D-IR spectroscopy in the gas phase" Optics Letters 2013 38 (18) pp. 3596-3599.
Harrington J. A. "A Review of IR Transmitting, Hollow Waveguides" Fiber and Integrated Optics 2000 19 pp. 211-217.
International Search Report and Written Opinion in International Patent Application No. PCT/GB2020/050127, dated Apr. 21, 2020, 14 pages.
Jenkins R. M. et al., "Hollow waveguide integrated optics: a novel approach to 10 μm laser radar" Journal of Modern Optics 1998 45 (8) pp. 1613-1627.
Laakmann K. D. et al., "Waveguides: characteristic modes of hollow rectangular dielectric waveguides" Applied Optics 1976 15 (5) pp. 1334-1340.
Marcatili E. A. J. et al. "Hollow Metallic and Dielectric Waveguides for Long Distance Optical Transmission and Lasers" The Bell System Technical Journal 1964 pp. 1783-1809.
UK Search Report in GB1900796.2, dated Jul. 15, 2019, 1 page.
Weidmann D et al., "Hollow waveguide photomixing for quantum cascade laser heterodyne spectro-radiometry" Optics Express 2011 19 (10) pp. 9074-9085.
Worrell C. A. et al., "Trace-Level Detection of Gases and Vapours with Mid-Infra-Red Hollow waveguides" Applied Physics 1997 30 pp. 1984-1995.

* cited by examiner

INFRARED SPECTROMETER

RELATED APPLICATIONS

The present patent document is a § 371 nationalization of PCT Application Serial No. PCT/GB2020/050127, filed Jan. 21, 2020, designating the United States, which is hereby incorporated by reference, and this patent document also claims the benefit of United Kingdom Application No. GB 1900796.2, filed Jan. 21, 2019, which are also hereby incorporated by reference.

FIELD OF THE INVENTION

The present invention relates to apparatus and methods for carrying out infrared spectrometry. For example, infrared absorption techniques may be used to detect one or more species in a sample, and heterodyne techniques may be used to detect one or more spectral features or spectral properties of received infrared light.

BACKGROUND

Infrared spectrometers can have a wide variety of uses and applications, such as analysis of gas or liquid phase samples in clinical, laboratory, industrial and environmental settings. Examples include the detection of carbon isotopes in human exhaled breath, of pollutants such as nitric oxides in the atmosphere, and of various vaporised solid sample materials. Some examples of how infrared spectrometry for these and other applications may be implemented are presented in WO2009/101374, WO2011/058330, WO2014/029971, and WO2014/083348.

In some such applications the sample may be introduced into the spectrometer apparatus for analysis, while in others the detection relates to infrared light which is received from a distance such as for atmospheric remote sensing including from ground, airborne and satellite platforms, characterisation of combustion or similar remote systems such as furnaces or in volcanology, and in astronomical studies of stars, galaxies and other remote sources.

For these and other applications, infrared spectrometry equipment which is robust, operationally stable, and compact may often be desirable, while maintaining suitably high levels of spectral resolution for the particular purpose. In some applications only the characterisation of an aspect of a single spectral line or other feature, such as position, width, or intensity of that feature may be required, while in other applications wider spectra across multiple such lines or features and over different ranges of wavelengths depending on the application, may be needed.

SUMMARY OF THE INVENTION

Aspects of the invention provide an infrared spectrometer comprising: a substrate; an optical circuit comprising one or more hollow waveguides provided by elongate channels formed in the substrate, the optical circuit being arranged such that infrared light in the optical circuit acquires one or more spectral properties for detection by the spectrometer; at least one infrared laser source arranged to couple laser light into an input hollow waveguide portion of the optical circuit; and at least one optical detector arranged receive and detect infrared light from an output hollow waveguide portion of the optical circuit. The spectrometer may also comprise an analyser arranged to determine said one or more spectral properties from the detected infrared light.

The optical circuit then typically also comprises one or more other optical components for controlling the infrared light within the optical circuit, such as one or more beam splitters, wave plates, mirrors, lenses, etalons, sample cells, reference cells, and so forth.

The determined spectral features may comprise for example one or more of a position, breadth, or amplitude of one or more spectral lines, which could for example be absorption or emission lines represented for example in terms of light wavelength, frequency, or wavenumber.

In particular, the elongate channels may be formed in one or more surfaces, in particular exterior surfaces, of the substrate, and may instead be referred to as grooves or trenches. The elongate channels may be so formed for example by moulding, machining, etching, and/or other processes for example as applied to the one or more surfaces. The one or more surfaces may each be substantially planar. The channels may take a variety of forms but may be substantially trapezoidal or rectangular in cross section. Internal angles in cross sections of the channels may be fairly sharp, or more curved or graduated, depending for example on particular techniques used to form the channels. Typically, the channels may have a width of less than 2 mm, and/or a depth of less than 2 mm, and/or a width of at least 0.2 mm, and/or a depth of at least 0.2 mm. These widths and depths may for example be measured at broadest and deepest points.

In order to properly constrain the infrared light propagating in the channels acting as hollow waveguides, the channels may be capped or covered or closed or sealed along the elongate direction, for example at the surface of the substrate in which the channels are formed. To this end, the channels may be covered by one or more cover elements, and these one or more cover elements then provide a wall of the channels in forming the required hollow waveguides.

The substrate in which the elongate channels are formed may be described as a block, and may be provided by an integral piece of material, or by multiple pieces of material which are abutted or joined in some way. The substrate or block may comprise one or more suitable materials such as at least one of: a metal; a copper alloy; a ceramic; and alumina. In some embodiments, the substrate is provided by a suitably sized block of a tellurium copper alloy. The substrate may typically have dimensions which provide an extent in the plane of the optical circuit of between about 10 to 100 $cm^2$. The thickness of the substrate may be for example around 3 to 30 mm.

In order to function effectively as waveguides without undue loss of intensity, mode mixing and other adverse effects, the surface roughness of the walls of the hollow waveguides should be kept at a suitably low level, for example having an ISO roughness grade of N7 or smoother, or N6 or smoother, with the roughness optionally depending on the wavelength of the laser light to be used in the waveguides. Having typical or maximum roughness deviations in the hollow waveguides which are less than about a quarter of wavelength of the infrared light used for the spectrometry is desirable for these reasons.

The infrared spectrometer may comprise a temperature controller arranged to maintain the substrate at a desired temperature, for example using one or more thermoelectric devices to heat and/or cool the substrate.

The or each infrared laser source may be a semiconductor laser device, for example an intra or inter band cascade laser or a quantum cascade laser, and may be configured to operate as a swept frequency laser source, for example operated using a suitable chirp pattern or other frequency variation over time. Other types of lasers may be used such as external cavity lasers and other widely tunable lasers.

The, or each, infrared laser source may be positioned adjacent to a corresponding input hollow waveguide portion of the optical circuit. In particular, positioning of a laser source may be by location in one or more recesses in, and/or at one or more protrusions from, the substrate, such as one or more dowels fitted into apertures in the substrate.

Collimating optics such as a suitable lens may also be provided, located between the infrared laser source and the input hollow waveguide portion, so as to couple the laser light into the input hollow waveguide portion. The collimating optics may be positioned by locating into or relative to one or more recesses or apertures in the substrate.

By suitably accurate relative positioning with respect to each other and the input hollow waveguide portion, the infrared laser source and the collimating optics may be arranged such that at least 50%, and optionally at least 80% of the laser light couples into a single mode within the input hollow waveguide portion. That single mode may be the EH11 mode, or other desirable EHxy modes, depending on the application.

The photodetector may be positioned adjacent to the output hollow waveguide portion of the optical circuit by locating using one or more recesses in, and/or one or more protrusions from, or other features of, the substrate.

The infrared spectrometer may comprise one or more further optical components, each of which may be positioned by locating using one or more recesses in the substrate such as slots.

By positioning components of the optical circuit in suitable slots or recesses formed in the substrate, and in particular in the same surface in which elongate channels for hollow waveguides a formed, very accurate and secure positioning of these components can be achieved.

The optical circuit may further comprise a sample cell arranged to receive a sample fluid, the optical circuit being arranged such that at least some of the laser light coupled into the input hollow waveguide of the optical circuit passes through the sample cell before being received at the photodetector, such that the infrared light in the optical circuit acquires from the sample fluid one or more of the spectral features for detection by the spectrometer.

Optionally, the optical circuit may contain two or more such sample cells, and circuit structure and components arranged such that spectral features can be detected separately for each such sample cell. The optical circuit may also or instead contain one or more similar reference cells, each such reference cell containing a reference fluid which also gives rise to spectral features for detection by the spectrometer. Such reference spectral features can be used for example to better characterise the sample for example by providing reference or base line measures for particular spectral features.

In particular, each sample or reference cell may comprise a length of hollow waveguide of the optical circuit, and typically also an optical window at each end of length of hollow waveguide for retaining the sample or reference fluid in the cell while permitting the infrared light to pass through the cell.

In order to enhance the optical path length through such a cell, at least some of the length of hollow waveguide forming the cell may be disposed in a spiral or labyrinthine form.

A sample or reference cell may also or instead comprise a cell space formed in a surface of the substrate, optionally to a similar depth as the elongate channels used to form the hollow waveguides. Walls of the cell space may then comprise a plurality of mirrors arranged to direct the infrared light received into the cell space from one hollow waveguide portion across the cell space a plurality of times, and to direct the infrared light into another hollow waveguide portion.

The infrared spectrometer may be arranged to direct received light received from outside the spectrometer into the optical circuit, to mix said received light with said laser light, and to detect said mixed light at the optical detector to provide detection of spectral features of said received light. In particular, such a spectrometer may be arranged to use heterodyne detection of the spectral features, for example by analysing a radiofrequency signal arising from the mixing of the received and laser light.

To this end, the received light may be mixed with said laser light within said optical circuit using a beam splitter installed at a junction of said hollow waveguides.

The optical circuit may be arranged to divide the laser light into at least two parts having a mutual frequency shift, and which are preferably sufficiently mutually coherent to give rise to an interference signal related to the frequency shift when combined at a detector. The optical circuit may then be arranged such that at least one of the two parts acquires one or more spectral properties for detection by the spectrometer, the spectrometer being arranged such that the optical detector receives and detects interference between the two parts.

In particular, the spectral properties acquired in one or both parts of the laser light may correspond to dispersive effects in the sample or species to be detected leading to changes in optical path length at particular frequencies for example closely related to particular spectral absorption features. The analyser is arranged to determine said one or more spectral properties from the detected interference between the two parts of the divided laser light.

In order to divide the laser light into the two parts, the optical circuit may comprise an acousto-optical modulator, for example driven by a radio frequency signal corresponding to the required frequency shift.

The optical circuit may comprise a beam splitter arranged to combine the two parts into a combined beam before acquiring the one or more spectral properties for detection. The infrared spectrometer may then further comprise transmission optics arranged to transmit the combined beam away from the spectrometer, and collection optics arranged to receive reflected portions of the transmitted light for detection at the optical detector.

Alternatively, the infrared spectrometer may comprise transmission optics arranged to transmit one of the two parts combined beam away from the spectrometer, and collection optics arranged to receive reflected portions of the transmitted light for detection at the optical detector. Such an arrangement could be used, for example, if the infrared spectrometer is to be used in a LiDAR arrangement.

The invention also provides methods corresponding to and for use of the described apparatus in carrying out infrared spectrometry, for example a method comprising: providing an optical circuit comprising one or more hollow waveguides provided by channels formed in one or more surfaces of a substrate and one or more cover elements closing over the channels at the one or more surfaces, the optical circuit being arranged such that infrared light in the optical circuit acquires one or more spectral properties; coupling infrared laser light into the optical circuit; detecting infrared light received from the optical circuit; and determining said one or more spectral properties from the detected infrared light.

As mentioned above, the optical circuit may comprise one or more optical components fitted into apertures in the one or more surfaces of the substrate.

A sample fluid may be introduced into a sample cell comprised in the optical circuit, such that the one or more determined spectral properties are spectral properties of the sample fluid.

Received light received from outside the spectrometer may be directed into the optical circuit, with the method then comprising mixing said received light with said infrared laser light, detecting said mixed light received from the optical circuit, and determining spectral features of said received light from said detected mixed light. For example such received light could be received using a telescope and/or solar tracking arrangement.

The invention also provides methods of constructing an infrared spectrometer, for example comprising: forming one or more elongate channels in a surface of a substrate; closing over the one or more elongate channels to form one or more hollow waveguides for carrying infrared light; and optically coupling an optical detector to an output portion of the one or more hollow waveguides.

Where this document refers to particular orientations for example using words such as upper, lower, top, bottom and so forth, it should be understood that this is for convenience of description and clarity only and that examples of the substrate, spectrometer and other combinations, can usually be oriented in various different ways without affecting their functionality or operation.

BRIEF SUMMARY OF THE DRAWINGS

Embodiments of the invention will now be described, by way of example only, and with reference to the drawings of which.

DETAILED DESCRIPTION OF EMBODIMENTS

Figure 1:
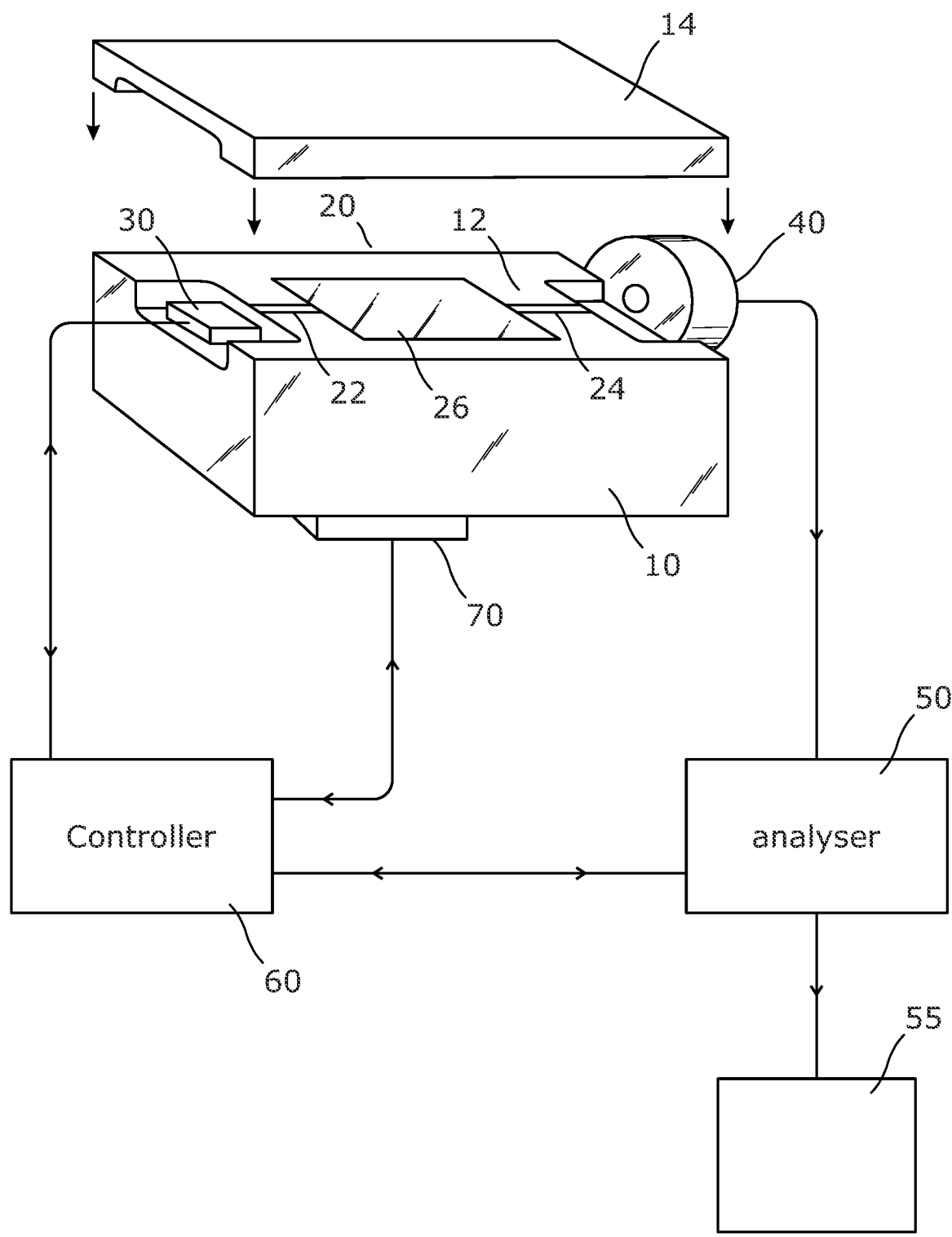
FIG. 1 illustrates an infrared spectrometer, with a substrate portion carrying an optical circuit shown in perspective views and some of the other elements shown schematically.

Referring now to FIG. 1 there is shown an infrared spectrometer. The spectrometer comprises a substrate 10, shown in perspective view, with some other functions and features of the spectrometer shown more schematically. The substrate 10 comprises an optical circuit 20. The optical circuit comprises one or more hollow waveguides for the propagation of infrared light through the optical circuit 20, and these hollow waveguides are provided by elongate channels formed in one or more surfaces of the substrate, for example in an upper planar surface 12 of the substrate as shown in the figure. An input hollow waveguide portion 22 and an output hollow waveguide portion 24 of the optical circuit 20 are shown, with other parts of the optical circuit 20 being generally indicated by region 26.

An infrared laser source 30 is arranged to couple infrared laser light into the input hollow waveguide portion 22 of the optical circuit. The optical circuit 20 may be constructed and arranged in various ways such that infrared light in the optical circuit acquires one or more spectral properties which the spectrometer is intended to measure or detect. This can be achieved in various ways as discussed in more detail below, but examples include by providing a sample cell within the optical circuit so that infrared light in the optical circuit is subject to absorption and/or dispersion by a sample within the sample cell, or by mixing infrared light from outside the spectrometer into the optical circuit such that interference with the light from the laser source 30 takes place.

An optical detector 40 is arranged to receive and detect infrared light from the output hollow waveguide portion 24 of the optical circuit 20. The output of the optical detector 40 is then passed to an analyser 50 to determine the one or more spectral properties to be measured, such as the position and/or magnitude of one or more spectral lines, ratios of such magnitudes and/or positions, and so forth. Determined spectral properties may be passed on to one or more other components or entities 55, for example to a display of a device incorporating the infrared spectrometer, to a personal computer or laptop for display, storage and/or further analysis, to a telecommunications element such as radio transmitter for transmitting determined spectral properties to a remote location, to a local or remote data storage unit for storing the determined properties, and so forth.

In some embodiments, the functions of the analyser 50 in determining the one or more spectral properties may be carried out remotely from the substrate 10 and optical detection by the detector 40, either substantially in real time as the output signal is received from the detector 40, or at a later time. For example, one or more of data storage, telecommunications and other functional elements may link the detector 40 and the analyser 50.

A controller 60 controls operation of the laser source 30, for example to effect frequency sweeps of the output infrared laser light to be coupled into the optical circuit 20, to control timing of such frequency sweeps or other features of the laser output, and/or other control. The controller 60 may also receive control related feedback from the laser source 30 such as from a temperature sensor of the laser source 30. The analyser 50 may also receive control signals from the controller 60, for example providing the analyser 50 with timing signals of the laser source output, and the controller 60 may also receive control signals from the analyser 50, for example signals relating to the output of the detector 40 which can provide feedback to the controller 60 on the operation of the spectrometer. The controller could also receive from and/or send control signals to ancillary systems such as systems arranged to handle sample fluids and/or calibration fluids. Such systems could comprise for example one or more valves, pressure controllers, pumps, and so forth.

A temperature device 70 may also be provided to control the temperature of the substrate. For example, the temperature device may be a thermoelectric cooler/heater device. The temperature device 70 may be fixed directly or indirectly to the substrate, may be controlled using suitable control signals from controller element 60, and may pass control signals back to the controller element 60 indicating a current temperature of the substrate. Typically, the controller 70 may use the temperature device 70 to maintain the substrate at a constant desired operating temperature in order to maintain operating stability, although variations in substrate temperature may be driven by the controller for example to control output frequency of the laser source 30 or for other purposes. For example the controller 60 could use a linear PID (proportional-integral-derivative) control loop to control the temperature device 70 with a high degree of stability.

Figure 2:
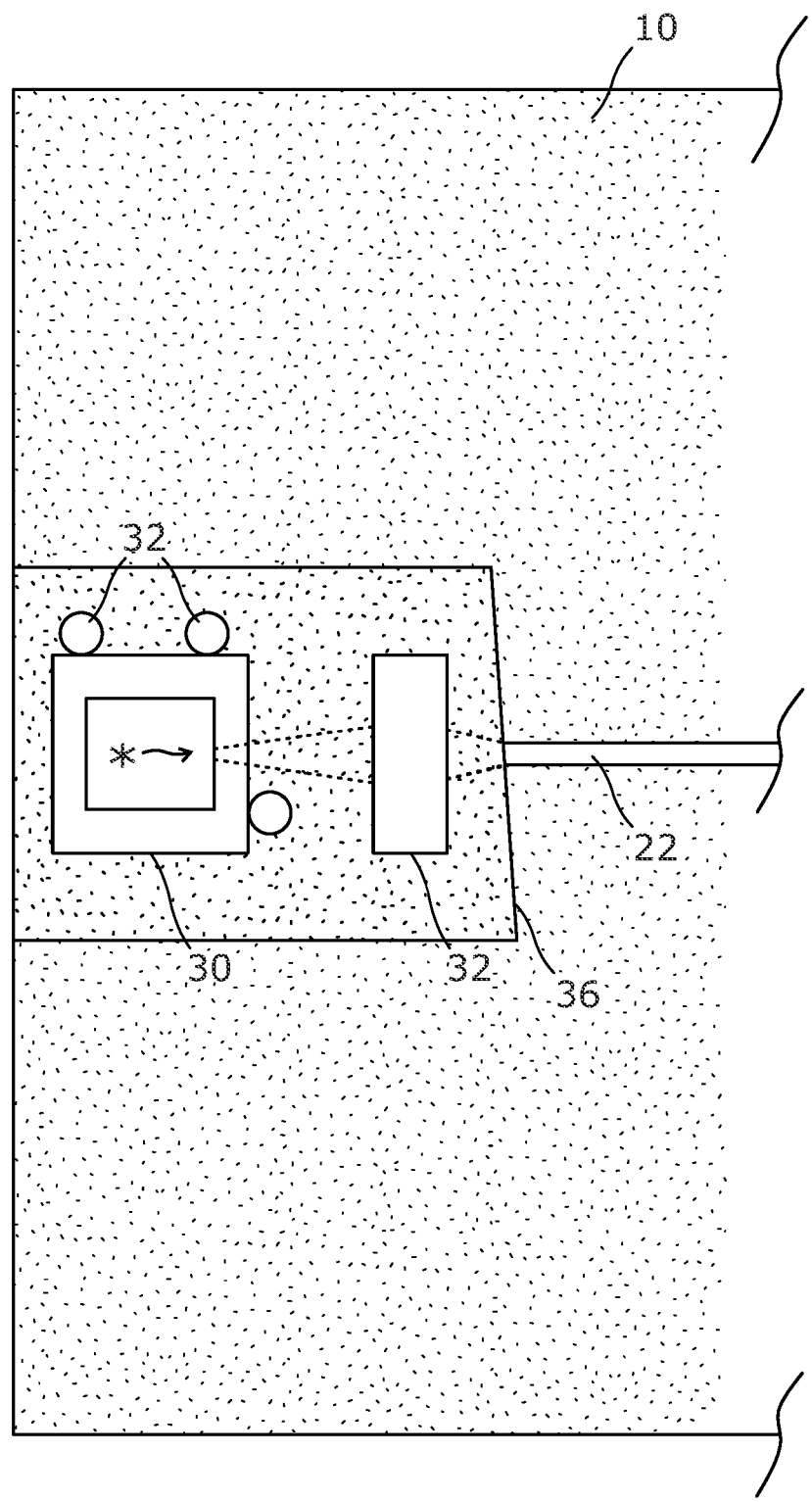
FIG. 2 shows in plan view how an infrared laser source of FIG. 1 may be mounted to the substrate and optically coupled to the optical circuit

Typically, the infrared laser source 30 may be a laser source arranged to output laser light having a variety or range of frequencies, such as a swept frequency laser source. Suitable laser devices for achieving this may include various semiconductor laser devices for example an intra band or inter band cascade laser, or a quantum cascade laser. The laser source 30 of FIG. 1 is driven by the controller 60, which controls the output frequency of the laser source 30 for example by modulating or sweeping a driving current for the laser source, or by sweeping a temperature control signal for controlling temperature at the laser source. Typical output wavelengths of the laser source 30 may be in the near to mid infrared, for example from about 1 to 10 μm, although mid to far infrared light could be used for example in the range further out to about 200 μm. A typical frequency variation range or sweep in operation of the spectrometer might correspond to a range of a few μm to a few hundred μm, with a repeat frequency for example of a few to a few tens of kHz, depending on the particular requirements and application. Other laser modulation schemes could operate at higher frequencies, for example at up to a few hundred MHz. FIG. 2 is a plan view showing ways in which the laser source 30 may be located at or on the substrate 10 and optically coupled to the input hollow waveguide portion 22. In particular, the laser source 30 may typically be directly or indirectly secured or mounted to the substrate 10, for example by gluing, bonding, clamping, or otherwise fixing. A predetermined position for the laser source may be defined by providing one or more recesses in, protrusions from, or other features of, the substrate, such as one or more dowels 32 as shown in the figure. Secure fixing and accurate location of the laser source 30 in such ways helps in ensuring the spectrometer is more compact and robust and manufacture precision is more reproducible.

Fixing of the laser source 30 to the substrate 10, optionally with one or more intervening layers or structures, can also improve thermal coupling between the substrate 10 and the laser source 30, for example to improve temperature stability of the laser source 30 and/or to permit the temperature of the laser source to be at least partially controlled through controlling temperature of the substrate 10, for example using temperature device 70.

An optical collimator 34, which may be provided by or comprise a miniature aspheric lens or GRIN lens, is typically provided to couple the output of the laser source 30 into the input hollow waveguide portion 22, and is also preferably fixed or secured, directly or indirectly, to the substrate. Location of the collimator 34 at the substrate may also be achieved using one or more recesses or slots in, protrusions from, or other features of the substrate, and final secure fixing of the collimator may be achieved for example by gluing or bonding. In other arrangements, the optical collimator 34 may be provided as part of the laser source 30, rather than as the separately positioned component shown in FIG. 2.

Fine adjustments of the positions of the collimator 34 and/or the laser source 30 may be required before either or both of these are finally fixed in place, in order to provide an optimal coupling of the laser light into the optical circuit 20, although typically the laser source may be fixed first and the collimator then adjusted for a final positioning. Collimator positioning with accuracies of the order of a micrometer in displacement and a milliradian in angle may be required to optimize coupling of the laser light into the input hollow waveguide portion 22.

The desired optimal coupling may depend on characteristics of the optical circuit and intended function of the spectrometer, but typically a high proportion of coupling into the EH11 fundamental mode (or some other preferred EHxy mode) of the hollow waveguides may be preferred, for example with at least 50%, or at least 80% of the laser light which couples into the optical circuit being coupled into the EH11 or other preferred mode. A discussion of the EH11 and other modes in hollow waveguides for light can be found in Laakmann and Steier, "*Waveguides: characteristic modes of hollow rectangular dielectric waveguides*", Applied Optics, vol. 15, No. 5, May 1996.

In some embodiments, the laser source 30 may be coupled to the optical circuit 10 using one or more optical fibres, with or without use of a collimator, and in this case the laser source can be located away from and not fixed to the substrate.

As shown in FIG. 2, a wall 36 of the substrate 10 at which the input hollow waveguide portion is open to receive the output of the laser source 30 may be perpendicular in orientation relative to a common axis of the laser output and hollow waveguide portion 22, but instead may be provided at slant angle from the perpendicular as shown in the figure in order to reduce or prevent back reflection from this wall 36 towards the laser source. A slant angle of a few degrees may be sufficient.

Although FIGS. 1 and 2 show only one laser source 30, two or more such laser sources may be used in some embodiments of the invention, for example to provide laser light over different frequency ranges, for inputting into different parts of the optical circuit, and so forth. One, some, or all of such laser sources may each be coupled to the substrate and the optical circuit 20 as illustrated in FIGS. 1 and 2 and as discussed above.

Figure 3:
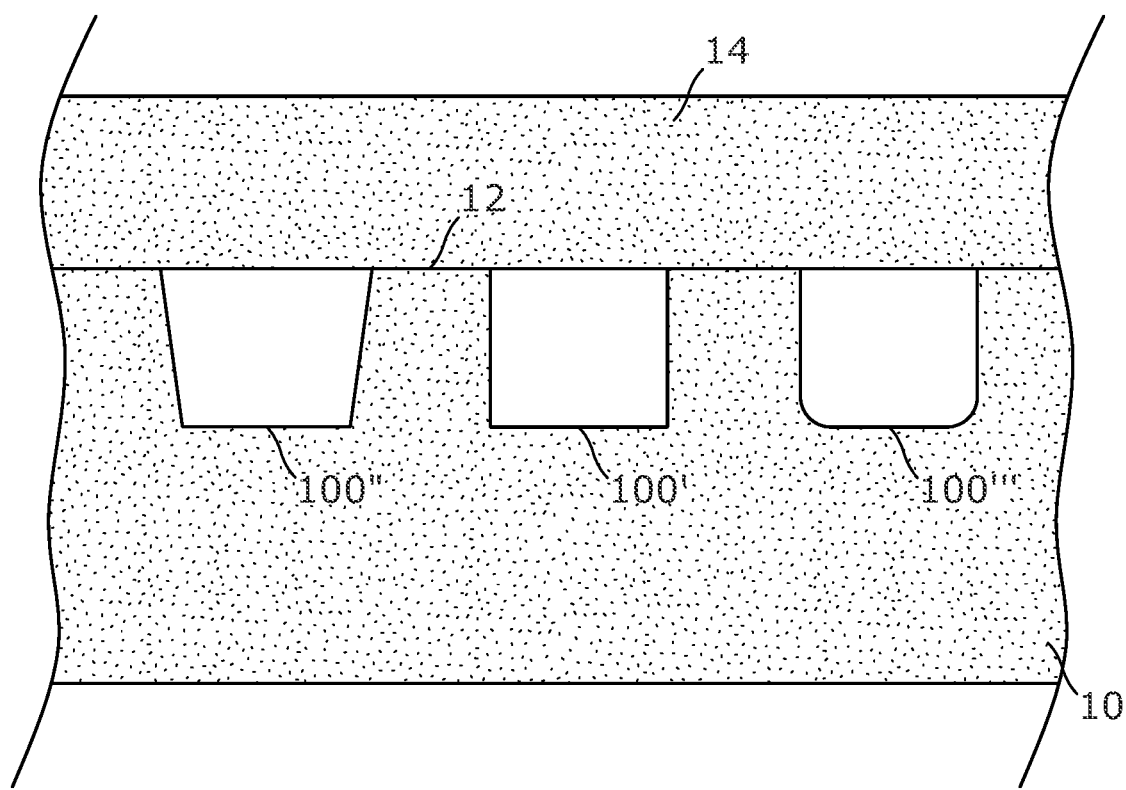
FIG. 3 illustrates in cross section two different structures which can be used for the hollow waveguides of FIG. 1.

FIG. 3 shows a cross section though the substrate 10 showing how hollow waveguides of the optical circuit may be constructed. Typically, these hollow waveguides may be formed as channels or grooves in a surface of the substrate 10 such as the upper planar surface 12 of FIG. 1, for example by machining or moulding. The channels may typically be square or rectangular in cross section as shown by hollow waveguide portion 100' in FIG. 3, but other forms are possible such as the trapezoidal cross section of hollow waveguide portion 100". At least some internal corners of the channels may be rounded in cross section, for example using a fillet geometry, as shown by hollow waveguide portion 100'''. Whether and the extent to which such rounding is used may depend for example om what technique is used to form the channels.

Noting that these hollow waveguides are intended for propagating light in the infrared, and particularly in the near to mid infrared, typical widths and depths of the hollow waveguides may be approximately in a range of 0.05 to 5.0 mm, more specifically 0.1 to 10 mm, and more specifically in a range of about 0.2 to 2.0 mm. With such dimensions the hollow waveguides are strongly multimodal to near and mid infrared light, so that accurate coupling of the laser source into a desired mode or modes at the input hollow waveguide portion may be desirable as discussed above.

In order to complete the fourth side of the hollow waveguides not provided by the channels in the substrate, one or more cover elements 14 are provided at the surface or surfaces of the substrate in which the elongate channels are formed. In FIG. 1 a single cover element 14 is shown which closes over the top of all of the elongate channels so as to complete the hollow waveguides of the optical circuit, but multiple separate cover elements could be used instead. The one or more cover elements 14 may be formed of the same material as the substrate or of a portion of the substrate they are to cover, for example of a copper alloy or machinable ceramic as discussed below, but could be of a different material to the underlying substrate if desired.

Note that in order to accommodate various optical components which may be required as part of the optical circuit 20 in addition to the hollow waveguides, the one or more cover elements 14 may be provided with recesses and/or apertures facing the optical circuit to allow the optical components to extend above the substrate surface 10 in which the hollow waveguides are formed. Such recesses and/or apertures may also, if required, provide support or constraint against movement of the optical components to help improve rigidity and robustness of the spectrometer.

In order to provide efficient operation of the spectrometer, the wall surfaces of the hollow waveguides, including walls of the channels formed in the substrate 10, and walls provided by one or more cover elements 14, should be sufficiently smooth, for example with local peak to valley deviations of less than about a quarter of the wavelength of the infrared light to be used, so for example having such deviations of less than about 1 µm for operational wavelengths of 4 µm. ISO roughness grades of about N6 to N7 may therefore be acceptable, depending on the infrared light to be used. Finer grades of surface roughness may be required for shorter operational wavelengths.

The elongate channels and hollow waveguides may be largely linear in the elongate direction. Changes in direction may be implemented for example using suitable mirror or reflective surfaces of the channel or waveguide, or additional mirror components, at points of change of direction, although curved channels and waveguides may also or instead be used. The term elongate used in respect of the channels may be taken for example to imply that most or all of the elongate channels are at least five times, and optionally at least ten times the width of the channels. In practice, typical lengths for most of the hollow waveguides are likely to be a few mm to a few cm, although this will depend on details of the particular implementation.

The substrate may be formed partly or entirely from a single material, for example being formed integrally from a single piece of such a material, or may be constructed from multiple pieces of one or more such materials. Coatings may be used on such materials whether the substrate is formed integrally as single piece or as multiple pieces. Substrate materials with good thermal conductivity and high thermal capacity may be preferred in order to enhance thermal stability and make thermal control more straightforward.

Some suitable materials for the substrate include metals, semiconductors, ceramics and polymers. Suitable metals could include for example copper or copper alloys such as tellurium copper alloys, such copper or copper alloys with gold coating, aluminium and aluminium alloys, and aluminium alloys with nickel coating. Suitable ceramics may include machinable and/or glass ceramics (for example Macor), alumina, zirconia, or magnesium oxide. Suitable semiconductors include silicon, particularly if etching is to be used for forming the channels. Suitable polymers may include polycarbonate materials, particularly if moulding is to be used for forming the channels. The one or more cover elements may be made of the same material(s) as the substrate, or one or more different materials, and such materials may also be provided with surface coatings of other materials as mentioned above.

The elongate channels providing the hollow waveguides may be formed using techniques such as machining, for example diamond milling, etching, or moulding. In order to achieve sufficiently low surface roughness, combinations of such techniques and or other polishing and finishing techniques may be used. As mentioned above, coatings of metal (gold, silver, nickel or other materials) or dielectrics can also be used to provide specific desirable thermo-physical or optical properties to the walls of the channels.

Although the hollow waveguide elongate channels as illustrated in FIG. 3 are formed as channels in a single piece of material of the substrate, the elongate channels may be formed in other ways for example by placing suitably shaped substrate tiles on top of one or more underlying substrate elements such that the elongate channels are defined by gaps between the tiles, in which case the substrate should be considered as a combination of the tiles and underlying element(s).

In some constructions such as shown in FIG. 1 all of the elongate channels and therefore hollow waveguides are formed in a single surface of the substrate, such as the upper surface 12 illustrated in FIG. 1, but the elongate channels and hollow waveguides may instead be formed in multiple surfaces at least some of which could be parallel, perpendicular or at other orientations to each other, with hollow waveguides passing around, or connecting at, edges between such surfaces.

The substrate may typically have dimensions of around a few cm in length and width in the plane of the optical circuit. For example, a single or multiple surfaces on which the hollow waveguides are provided, such as the upper surface 12 in FIG. 1, may have a surface area of less than about 100 cm$^2$, and may have a surface area of more than about 10 cm$^2$.

The optical circuit 20 receives laser light from the laser source 30, and enables light in the optical circuit to acquire one or more spectral properties for detection. To this end, the optical circuit may typically comprise one or more other optical components and/or elements. Each such component or element may typically intersect one or more hollow waveguides, or may be located in an optical path between ends of two or more hollow waveguide portions.

For example, such optical components may comprise one or more wave plates (such as quarter wave plates), beam splitters, mirrors, filters and/or lenses. Some such optical components may conveniently be accommodated in recesses such as slots or grooves in the substrate. Since such features of the substrate can be formed very accurately by machining, moulding or other techniques, and this provides a convenient way of accurately and securely positioning such optical components, and in a manner which is highly reproducible in manufacture.

Other elements in the optical circuit may include one or more sample and/or reference cells in which a hollow waveguide portion, and/or another space in the substrate, is used to hold a fluid sample or a reference fluid such that the optical circuit passes through the fluid sample or reference fluid, such that the infrared light in the optical circuit acquires one or more spectral properties from the sample or reference fluid for detection by the spectrometer.

Figure 4A:
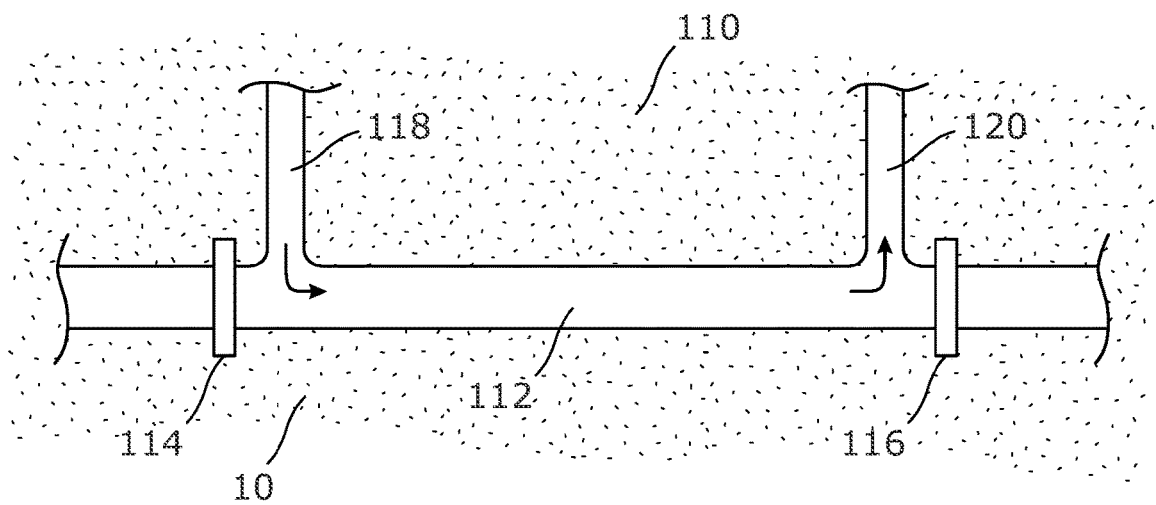
FIGS. 4*a* to 4*c* show some alternative structures for a sample or reference cell integrated into the substrate and optical circuit of FIG. 1.

A first example of such a sample or reference cell is shown in plan view in FIG. 4a. In this example, the cell 110 is defined by a straight length of hollow waveguide 112 which is intersected by optical windows 114, 116 (which may be secured in suitable slots in the substrate) spaced apart by a sufficient distance along the waveguide 112 to provide a desired optical path length along the cell 110. An entrance port 118 permits a sample or reference fluid to be introduced into the cell, and an exit port 120 permits fluid in the cell to leave. A sample fluid may typically be pumped through the cell in this way, for example under control by the controller of ancillary system components such as pumps and valves. The entrance and exit ports could be formed as channels in the substrate in the same plane as the optical circuit as shown in FIG. 4a, or could intersect the hollow waveguide 112 through the substrate or through an overlying cover element 14 (not shown). The optical windows 114, 116 serve to prevent the sample or reference fluid from escaping from the cell along the hollow waveguide 112, while being essentially transparent to the infrared light within the optical circuit.

If the cell 110 is a reference cell then one or both of the entrance and exit ports might be omitted, or provided for introducing a reference fluid during manufacture or set up.

In operation, infrared light in the optical circuit passes through the cell 110 and thereby acquires one or more spectral properties imposed on the light by the sample or reference fluid. For example, the sample or reference fluid may impose one or more absorption lines on the infrared light as the laser source 30 sweeps in frequency past such absorption lines.

Figure 4B:
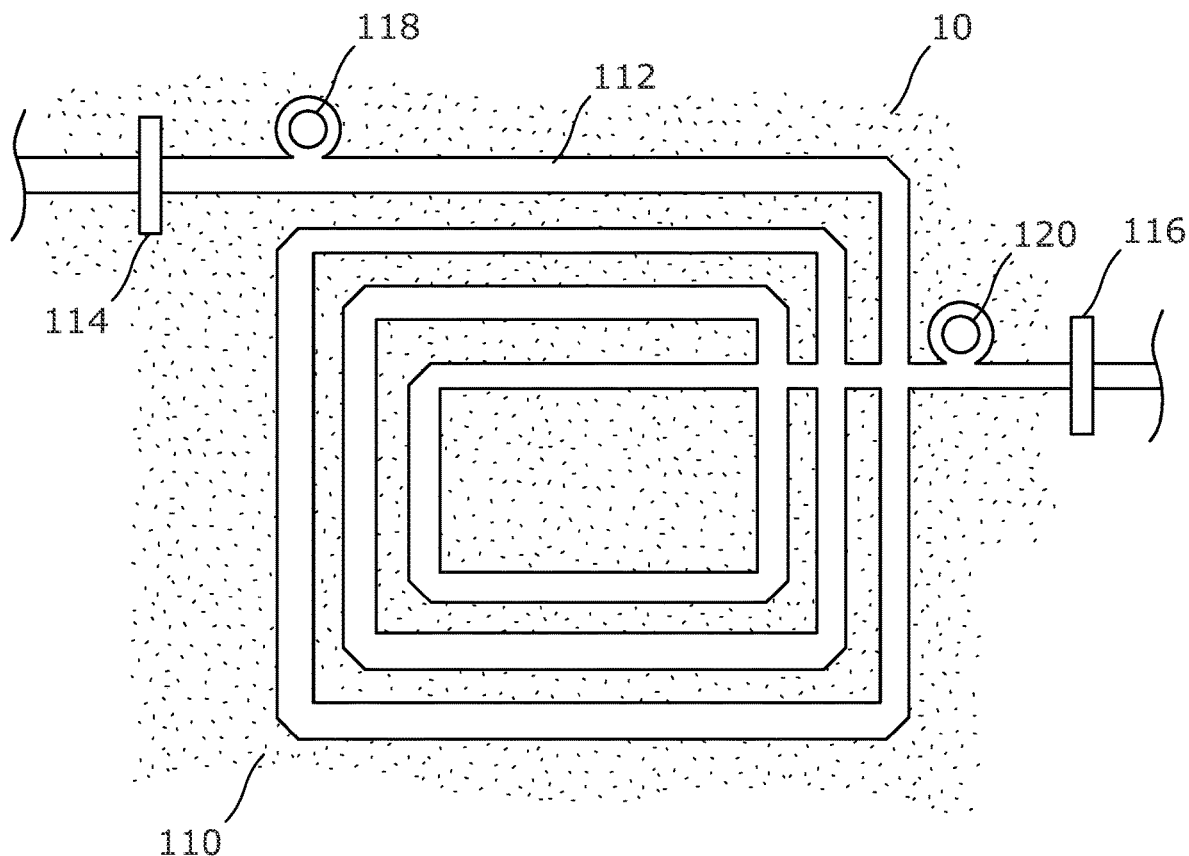
Figure 4C:
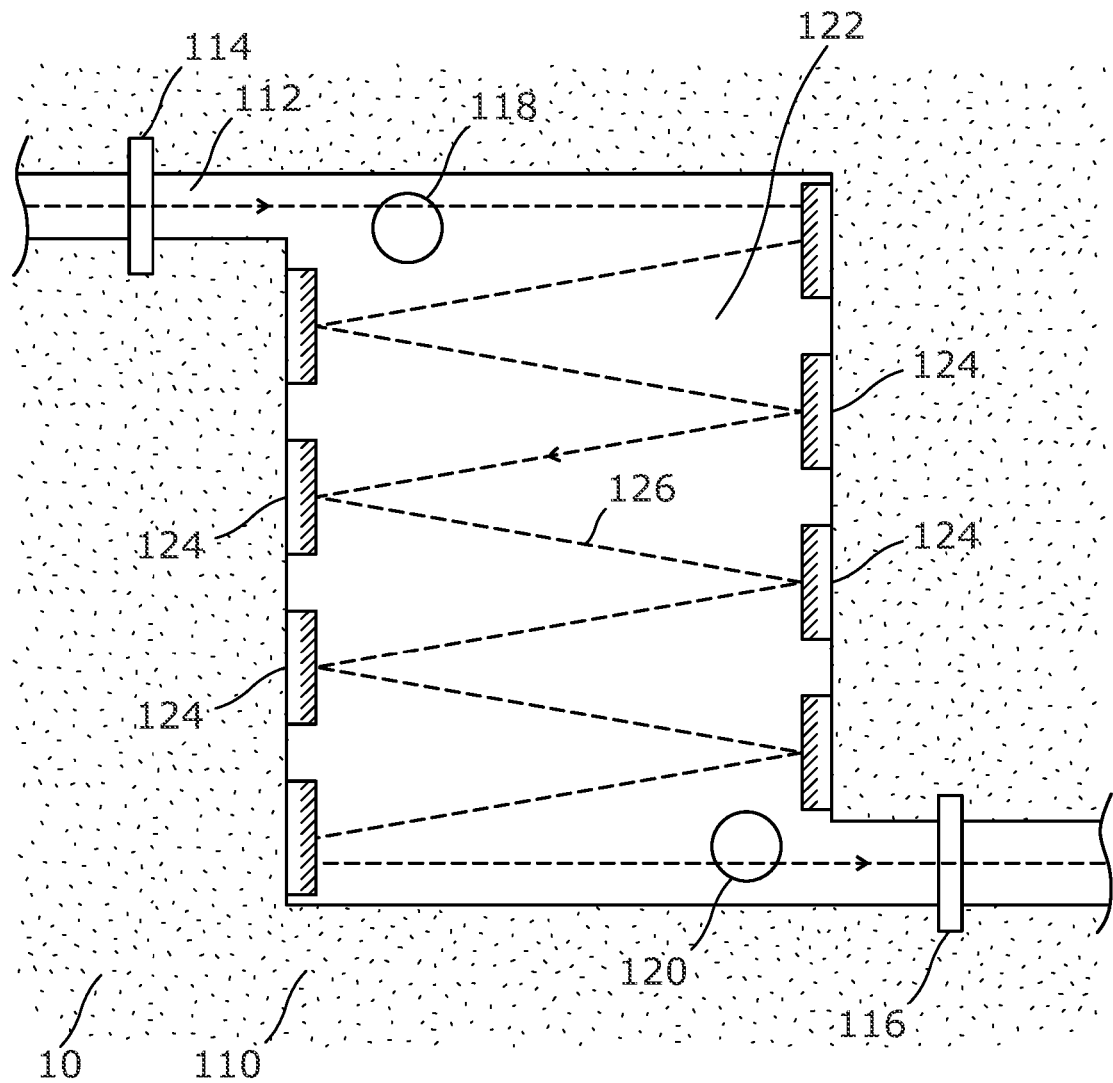

The example of FIG. 4a provides a rather limited optical path length through the cell 110, and therefore a low sensitivity of the spectrometer to the sample or reference fluid. Various schemes may be used to increase the optical path length through the sample or reference fluid, for example as shown in FIGS. 4b and 4c. In FIG. 4b the portion of the hollow waveguide 112 between the optical windows 114, 116 is elongated for example by using a spiral or other complex or labyrinthine form in the plane of the substrate surface carrying the hollow waveguide. In FIG. 4b the entrance and exit ports 118, 120 are shown as extending to the hollow waveguide 112 through the depth of the substrate. Efficient progression of light along the complex path can be enhanced by providing a reflecting surface at each corner at an intermediate angle between the entrance and exit angles of the channels at that corner, as also shown in FIG. 4b.

In FIG. 4c the hollow waveguide 112 opens into a broader cell space 122 formed within the surface of the substrate 10 in which an extended optical path is provided by reflection from mirrors 124 disposed at walls of the cell space 122. In the arrangement of FIG. 4c the optical path 126 through the cell is caused to alternate between opposite sides of the cell space 122 by the mirrors 124 being located along those opposite sides, but various other arrangements are of course possible. FIG. 4c also shows mirror components which stand proud of the walls of the cell space 122, but this is not necessary and the mirrors 124 could for example be provided by suitably angled surfaces formed largely along the lines and for example using the walls of the cell space 122.

It can be seen that by using arrangements similar to those of FIGS. 4b and 4c the optical path length through a sample or reference cell 110 provided within the optical circuit can be extended to many times that of a simple linear cell as illustrated in FIG. 4a.

Referring back to FIG. 1, one or more optical detectors 40 are arranged to receive and detect infrared light from the optical circuit, in particular from one or more corresponding output hollow waveguide portions 24. Each such optical detector 40 may typically be provided by a photodetector such as a single solid state photodiode component, for example a single discrete device package. Such detectors could for example be implemented using materials such as Indium arsenide, indium gallium arsenide, or mercury cadmium zinc telluride. Photovoltaic photoconductors, thermopiles, bolometers, avalanche photodetectors and other detector types may be used. In some embodiments one or more pixelated optical detectors may be used, for example a CCD or other pixelated optical sensor, for example in combination with a suitable dispersive component such as an optical grating so as to detect multiple frequencies of light spread across multiple pixels.

The or each optical detector may be directly or indirectly secured or mounted to the substrate 10, for example by gluing or bonding, or by using suitable fixtures such as one or more screws, bolts or clamps. If required, coupling or focusing optics such as a miniaturised aspheric lens may be used to control the coupling of infrared light from an output hollow waveguide portion 24 to a corresponding optical detector. If such coupling optics are used then rather fine tolerances for positioning of the coupling optics and detector may be required, and such tolerances can be implemented using suitable recesses in, protrusions from, or other features of, the substrate, such as one or more dowels. Secure fixing and accurate location of the one or more optical detectors in such ways helps in ensuring the spectrometer is more compact and robust and manufacture is more reproducible.

Figure 5:
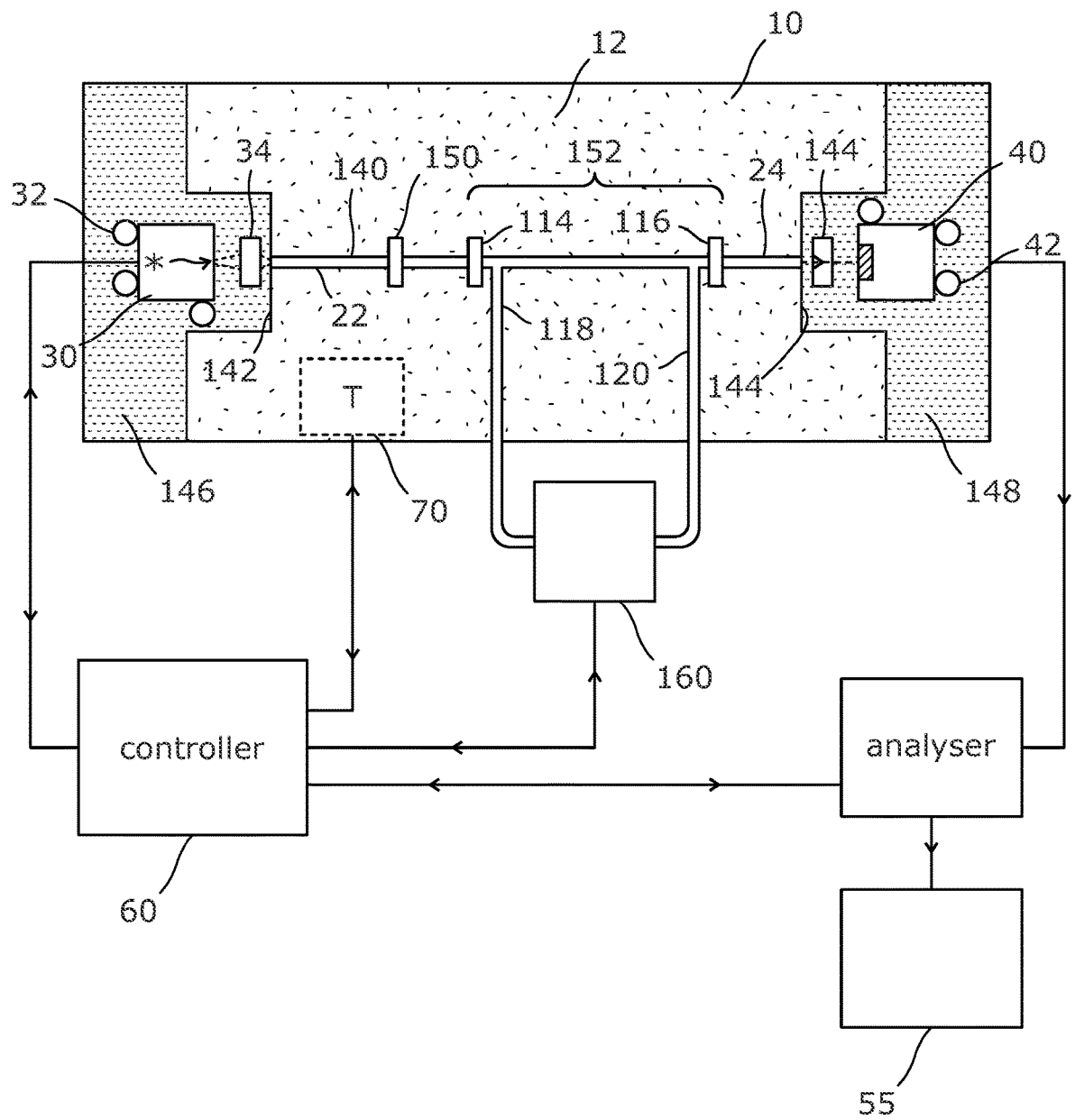
FIG. 5 illustrates in plan view of the substrate and showing some other elements schematically, an infrared absorption spectrometer using the general structure of FIG. 1 and optionally other features discussed in connection with FIGS. 2 to 4*c*.

FIG. 5 shows, generally in plan view, an example of how a spectrometer of FIG. 1 and any of FIGS. 2 to 4C as discussed above, may be used to implement an infrared absorption spectrometer with at least one sample cell, at least one infrared laser source and at least one optical detector. A planar surface 12 of the substrate 10 carries a single, linear, hollow waveguide 140 which opens at one end onto a first wall 142 of the substrate which faces towards the laser source 30, and at the other end onto a second wall 144 of the substrate which faces towards the optical detector 40. The top of the hollow waveguide 140 is closed by one or more closing elements 14 (not shown) which cover some or all of the planar surface 12.

The laser source 30 is precisely positioned on a first stage surface 146 of the substrate, for example with reference to one or more dowels 32 or other features, such that a laser beam is directed through a collimating lens 34 to the opening of the hollow waveguide 140 at the first wall 142. The laser source 30 and collimating lens 34 may be precisely positioned so as to carefully control the coupling of the laser beam into an input portion 22 of the hollow waveguide as discussed above. The first stage surface 146 may conveniently be parallel to, but stepped down from, the planar surface 12 such that the output of the laser source 30 is at the correct level for being directed into the hollow waveguide 140.

The optical detector 40 is positioned on a second stage surface 148 of the substrate, for example also with reference to one or more dowels 42 or other features, so as to collect infrared light output from an output portion 24 of the hollow waveguide where it emerges at the second wall 144. Coupling optics 44 may be located between the end of the output portion 24 and the detector 40 such that the collected light is more accurately focused or otherwise distributed onto the optical detector. The second stage surface 146 may also conveniently be parallel to, but stepped down from, the planar surface 12 such that the detector is at the correct level to receive light from the hollow waveguide.

Optionally, infrared light propagating along the hollow waveguide 140 from the laser source 30 meets a quarter wave plate 150 that intersects the hollow waveguide 140. The quarter wave plate may be precisely located and oriented across the hollow waveguide for example by fitting in or with reference to a slot or other feature in the substrate. The quarter wave plate is provided to reduce the effect of potential reflections of the laser light back towards the laser source 30 by changing the polarization state of the reflected light. Additional or alternative components which may intersect the hollow waveguide could include attenuators for optimizing power selection, polarizer elements for polarization selection and power adjustment, bi-refringent crystals for polarization manipulation, and so forth.

A sample cell 152 is provided by sealing a length of the hollow waveguide 140 between optical windows 114, 116 such that a sample fluid introduced into the sample cell does not escape along the hollow waveguide. A sample fluid entrance port 118 and a sample fluid exit port 120 provided as channels in the surface 12 of the substrate are coupled to a sample handling unit 160, for example including one or more valves and/or pumps, arranged to control introduction of the sample into and out of the sample cell 152 through the entrance and exit ports, flushing of the sample cell etc. The sample handling unit 160 may be under control of controller 60, which also controls temperature device 70 so as to control the temperature of the substrate as discussed above. The temperature device 70 may be provided, for example, by a thermoelectric device bonded or otherwise coupled to an underside surface of the substrate 10.

The controller 60 also controls operation of the infrared laser source 30, and may also be coupled to the analyser 50 which is arranged to receive a signal output by the optical detector representing intensity or power of light incident on the optical detector.

In operation, a sample fluid is introduced into the sample cell 152 using the sample handling unit 160. The laser source 30 is then repeatedly scanned in frequency across a spectral region of interest, and the intensity of light detected at the optical detector 40 is passed as a signal to the analyser 50 which determines one or more spectral features of the detected light such as positions or intensities of one or more absorption lines of the sample fluid contained within the sample cell 152. Additional frequency modulation may be added to the laser frequency, with associated data processing, in order to provide further enhancement of signal to noise ratios in the detected spectral features.

One example application for the spectrometer of FIG. 5 is for the measurement of isotopes such as $^{12}CO_2$ and $^{13}CO_2$ in exhaled breath. For this purpose the laser source 30 could be a quantum cascade laser operating at around 4.3 μm. However, a wide variety of other applications exist, for example wherever there is a need to analyse a gas mixture and a compact and robust solution is required. Some examples include isotopic ratio analysis, molecular concentrations, industrial process control, gas sensing devices on autonomous vehicles such as airborne drones, and so forth.

Some variations in the layout of the spectrometer of FIG. 5 on the substrate 10 include, for example using a sample cell 110 which permits a longer optical path length through the sample such as those shown in FIG. 4b or 4c, and/or the optical circuit comprising multiple cells 110 each of which may be a sample cell or a reference cell.

Figure 6:
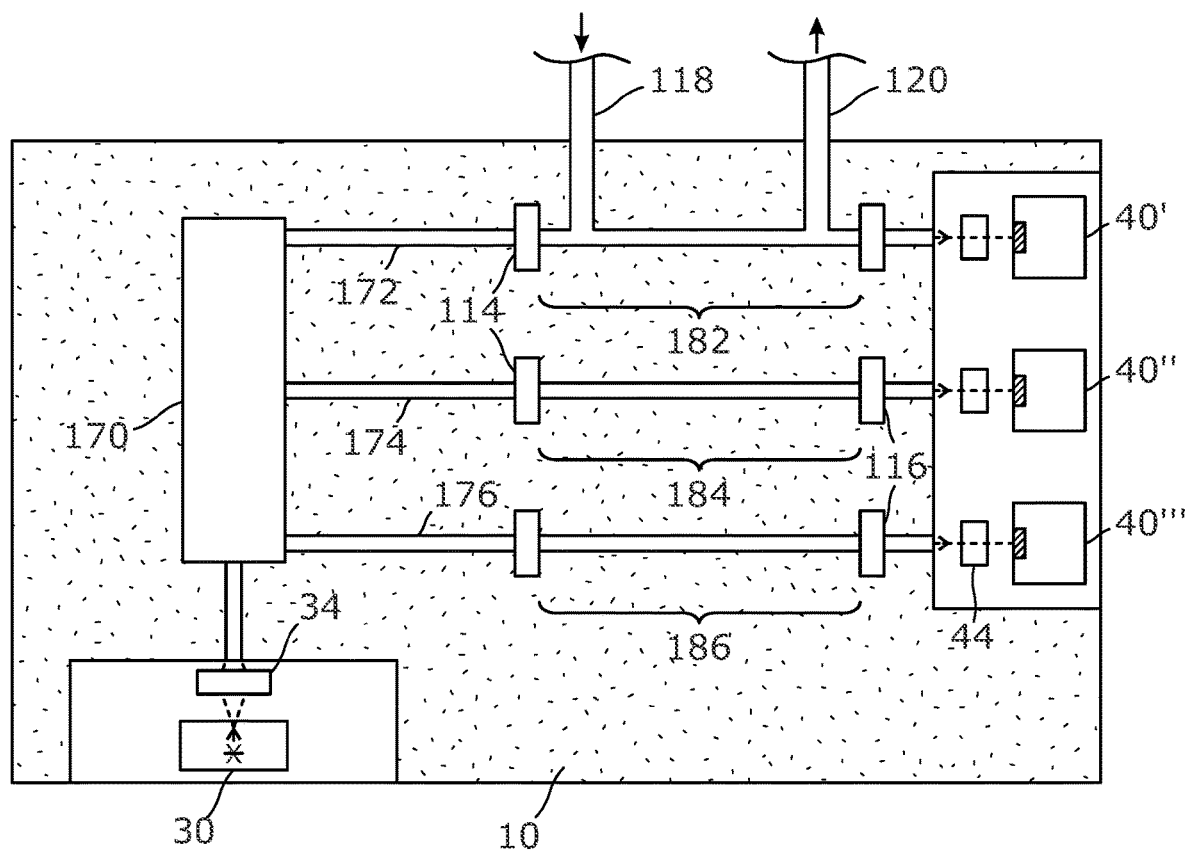
FIG. 6 shows a variation on the optical circuit of FIG. 5 using two reference and one sample cell with three optical detectors.

For example, in FIG. 6 a variation of the optical circuit 26 is shown in which an infrared laser source 30 provides infrared light which is divided into three separate paths by a splitter element 170 which could for example be provided by an active optical switch such as a micro mirror device, or a combination of passive optical components such as beam splitters. Each of the three separate paths is provided by a different hollow waveguide 172, 174, 176 each of which comprises a cell 110, each cell being defined by a pair of optical windows 114, 116 in the respective hollow waveguide preventing a fluid within the respective cell from escaping along the hollow waveguide forming the cell 110. In this example, one of the cells 110 is provided as a sample cell 182 with one or more ports 118, 120 provided for introducing a sample fluid into the sample cell 182, and the two other cells are provided as reference cells 184, 186 containing different reference fluids such as different gases or mixtures of gases.

In FIG. 6, three optical detectors 40', 40", 40''' are provided, with each optical detector receiving infrared light which has passed through a different one of the cells 182, 184, 186, and signals from these three detectors are passed to an analyser 50 (not shown) for detection of one or more spectral features of the sample in the sample cell and of the reference fluids in the reference cells. Measures of these spectral features can then be combined to provide a more accurate measure of the sample. For example, the reference cells may each carry a different concentration of a target species, and detection of a spectral feature of the target species in each of the reference cells can be used to calibrate detection of a spectral feature of the target species in the sample cell.

Although in FIG. 6 a single infrared laser source 30 and multiple optical detectors 40 are provided, multiple laser sources could be used for example one laser source for each cell 182, 184, 186 to avoid some or all of the optical switching or multiplexing to the cells, and/or a single optical detector 40 could be used for more than one of the cells, by providing suitable optical switching or demultiplexing between such cells and an optical detector.

In the infrared absorption spectrometer arrangements discussed in connection with FIGS. 5 and 6, one or more spectral features are detected which originate from one or more sample fluids held within cells provided at the substrate. In other embodiments, a sample to be detected may be located outside of the substrate, or the spectrometer may more generally be arranged to detect one or more spectral properties of infrared light received from outside the spectrometer. Applications for such arrangements could include for example atmospheric monitoring, satellite based atmospheric observations, distant characterisation of combustion systems, and characterisation of stellar and interstellar objects and planets.

Figure 7:
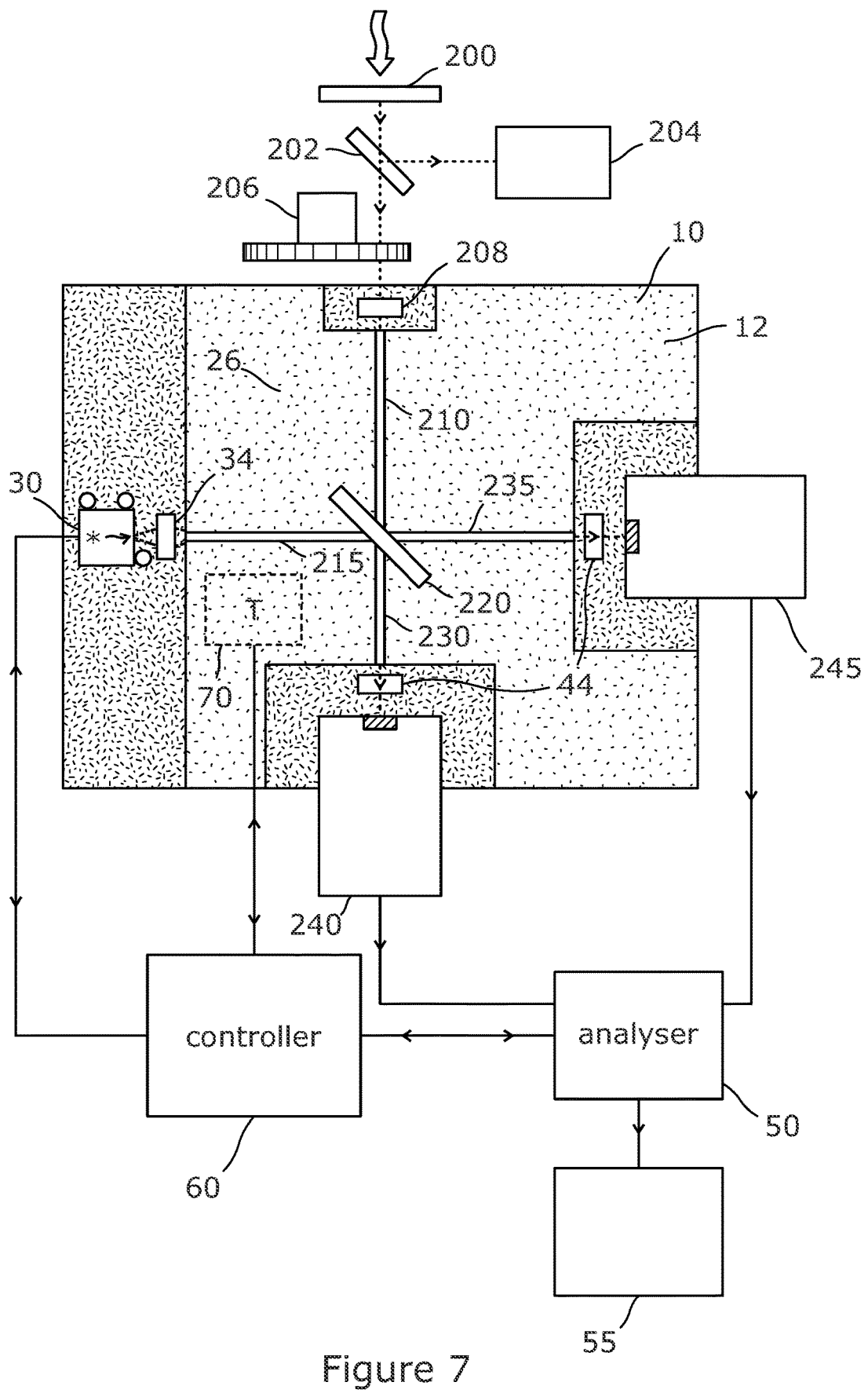
FIG. 7 illustrates in plan view of the substrate, and showing some other elements schematically, an infrared heterodyne spectrometer using the general structure of FIG. 1 and optionally other features discussed in connection with FIGS. 2 to 6.

To this end, FIG. 7 shows, generally in plan view, an implementation of the spectrometer of FIG. 1, in which received light from an external or remote source or sample is received at collection optics 200, which could comprise for example a telescope, and/or a solar tracker arrangement so that the received light is received from the direction of the sun.

A beam splitter 202 may then be used to direct a portion of the received light to a power detector 204, the output of which could for example be used to monitor source such as solar intensity as a diagnostic parameter, for example to detect clouds passing. The beam splitter 202 may typically be a dichroic beam splitter that reflects a visible portion of the light onto power detector 204 while transmitting an infrared portion for receiving into the optical circuit.

Received light may also be amplitude modulated before being received into the optical circuit for further analysis by the spectrometer, for example to help enable phase sensitive detection, and such amplitude modulation could be carried out by a mechanical chopper or other amplitude modulator 206 before the received light enters the optical circuit 26 formed on a surface 12 of the substrate 10. Such amplitude modulation can for example be used to alternately measure light from two different scenes to enable correction for instrument drift and noise through a differential measurement approach.

Optionally, a collimating lens or other optical element 208 may be used to improve coupling of the received light into the optical circuit, and in particular into a first input hollow waveguide portion 210.

An infrared laser source 30 is also provided, for example as provided for in examples above, and infrared light from the laser source is coupled into a second input hollow waveguide portion 215 of the optical circuit, for example by a collimating lens 34. The laser source 30 and collimating lens 34 may be precisely positioned so as to carefully control the coupling of the laser beam into the hollow waveguide as discussed above.

The first and second input hollow waveguide portions 210, 215 may be oriented on the surface of the substrate substantially at right angles to each other, but in any case these two waveguide portions bring the light from the laser source 30 and the externally received light to meet at a beam splitter component 220 forming part of the optical circuit, for example located around the middle of the optical circuit and substrate. The beam splitter 220 combines and directs the laser light and the externally received light through a first output hollow waveguide portion 230 to at least a first optical detector 240 where interference between the laser light and the externally received light is detected. The first output hollow waveguide portion 230 of FIG. 7 is substantially a straight line extension of the first input hollow waveguide portion 210, and substantially at right angles to the second input hollow waveguide portion 215, but other arrangements are possible depending on the beam splitter 220 and any other optical components used.

Under control of controller 60, the frequency of the laser source 30 can be repeatedly scanned across a spectral region of interest, and the intensity of light detected at the first optical detector 240 then comprises heterodyne interference between the laser source light and spectral features of the received light which lie in that spectral region. This interference therefore produces, at the detector output, an intermediate frequency signal in the radiofrequency domain that contains the down-converted spectral features to be detected in the light received at the collection optics 200.

At least radiofrequency components of the output of the first optical detector 240 are then passed as a signal to the analyser 50 which can use spectral analysis of the radiofrequency components to determine one or more spectral features of the received light from the radiofrequency components, such as positions or intensities of one or more spectral lines. This analysis can be performed for example by using a fixed radiofrequency filter and a RF power detector in conjunction with a frequency sweep of the laser frequency, or by using radiofrequency spectral analysis techniques such as digital correlation, fast Fourier transform analysis, or acousto-optical spectrometry.

The first optical detector 240 may typically have a response bandwidth of around 30 MHz to 30 GHz or more, depending on the application, so that the output signal contains the required spectral detail with a typical laser source scan frequency for example of a few kHz or more down to around 0.1 Hz or less.

A second optical detector 245 may be provided which also receives a portion of the combined laser light and externally received light from the beam splitter, for example at the end of a second output hollow waveguide portion 235 which may be oriented in a direction at right angles to the first output hollow waveguide portion 230. Whereas the first optical detector 240 needs to have a response time which is fast relative to the frequency scan rate of the infrared laser source, the second optical detector 245 may have a much lower response rate so that the output of the second optical detector represents the intensity of light received at the detector averaged over one or more frequency scans of the laser source, for example having a bandwidth of around a few kHz for a laser scan frequency of a few tens of kHz. Both the first and second detectors may be provided by photodetector devices having suitable properties, for example using indium arsenide, indium gallium arsenide, mercury cadmium zinc telluride, or other detector semiconductor materials. For the fast detector 240, devices using nano-antennas together with a non-linear response system equivalent to a diode, or devices using resonant optical cavities could be used.

The output of the second optical detector 245 is also passed to the analyser 50 which can use this signal for example to monitor the power of the laser source output in order to help compensate for instabilities and variations in the laser source. Output from the second optical detector 245 may also be used by the analyser 50 for example to monitor the relative frequency of the laser output of the optical source 30 by adding an etalon into the hollow waveguide 235 on the approach to the detector 245. Successive peaks and troughs in the intensity of light transmitted through the etalon permit relative laser frequency change to be detected as the laser is tuned.

Amplitude modulation imposed on the received light by amplitude modulator 206 may be used by the analyser 50 to carry out phase sensitive detection of the signal output by the first optical detector 240 by using lock-in amplification techniques.

As discussed for other arrangements above, a temperature device 70 may be provided to control temperature of the substrate under control of the controller 60. The infrared laser source, detectors, and other components may be mounted to the substrate, and the hollow waveguide structures formed in the substrate, as variously discussed above. Optical components such as the beam splitter 220 and collimating lenses may be fitted into slots or other features accurately machined into or otherwise provided on the substrate.

The arrangement for a heterodyne infrared spectrometer discussed above in connection with FIG. 7 can be varied in a number of ways. For example, an etalon or grating could be placed in the path of the second output hollow waveguide portion, so that the signal at the second optical detector is representative of either an average optical frequency of the laser output if a slow detector is used, or instantaneous frequency within the frequency scan if a sufficiently fast detector is used. By use of an additional beam splitter within the optical circuit and two second detectors, both an average power output and a measure of frequency of the laser source output could be monitored.

Other optical components may be included in an optical circuit similar to that of FIG. 7, for example an additional quarter wave plate could be included in the path of the second input hollow waveguide portion 215 in order to suppress effects of laser light backscatter to the laser source.

A heterodyne spectrometer as discussed above in connection with FIG. 7 can provide very high spectral resolution spectroscopy of molecular constituents, by both emission and absorption mechanisms, in infrared regions around the 2-20 μm range, and because of the integration of the optics with hollow waveguide structures on a substrate, can provide a fully encapsulated, highly ruggedized optical system. The high available spectral resolution may be desirable to fully resolve the absorption and/or emission line shapes of molecular constituents from which thermophysical properties can be remotely obtained, such as temperature, pressure, Doppler shift due to wind, electromagnetic fields, and so forth.

Typical prior art high resolution mid infrared spectrometers such as Fourier transform spectrometer or grating spectrometers tend to rely on large and complex optical systems which are not suitable for high levels of miniaturisation and cost effective deployment on mobile platforms as part of a network of instruments.

Figure 8:
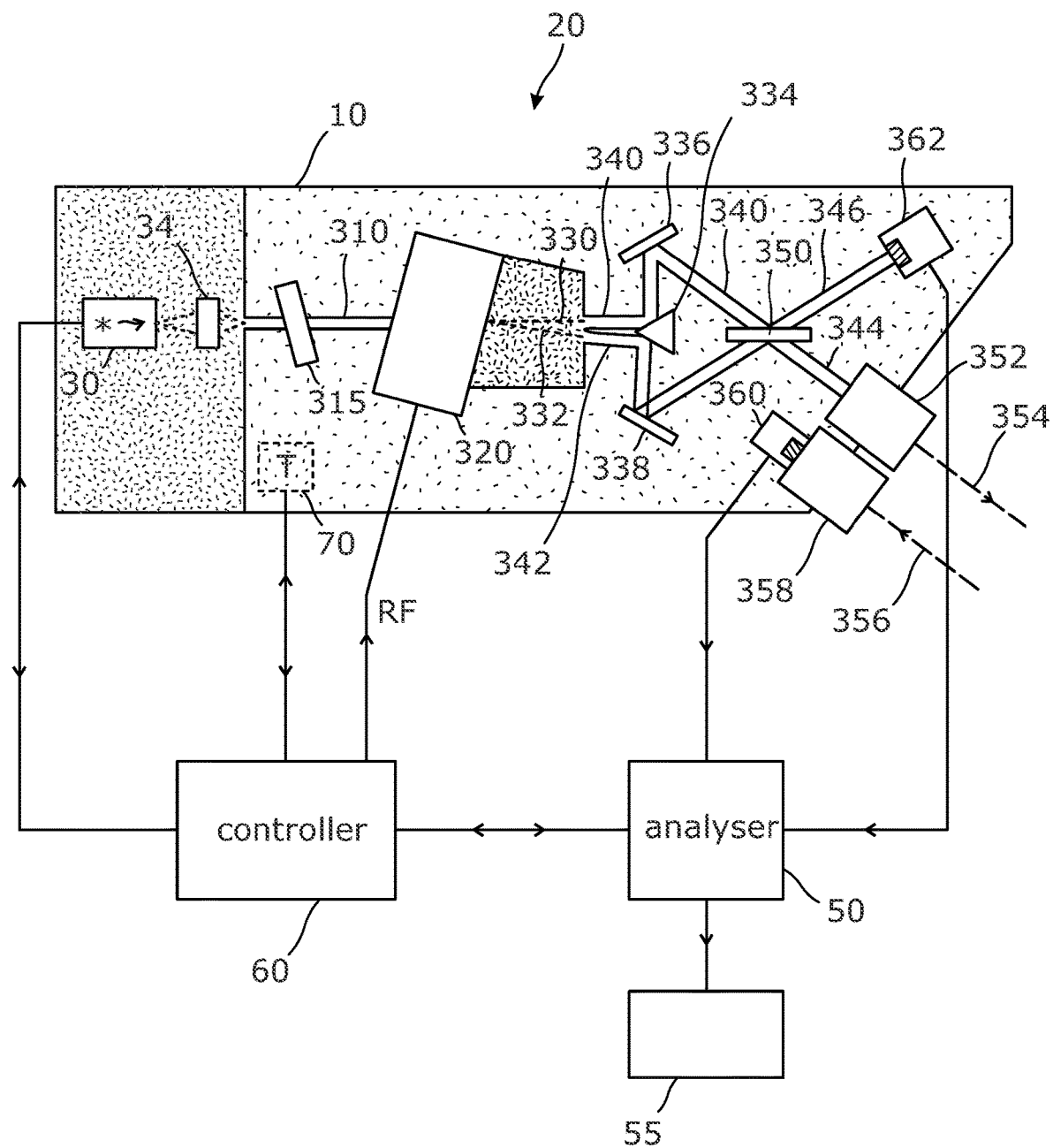
FIG. 8 illustrates in plan view of the substrate, and showing some other elements schematically, an infrared dispersion spectrometer using the general structure of FIG. 1 and optionally other features discussed in connection with FIGS. 2 to 7.

FIG. 8 shows, generally in plan view, another implementation of the spectrometer of FIG. 1, which operates as a dispersion spectrometer, for example using principles and techniques discussed in WO2011/058330. In particular, the optical circuit may be arranged to divide the laser light into two parts or beams with a mutual frequency shift, for example using an acousto-optical modulator, and such that at least one of the two parts then acquires one or more spectral properties for detection by the spectrometer. The two parts will typically be sufficiently mutually coherent, such that interference between the two parts can subsequently be detected.

An optical detector then receives, and detects interference between the two parts, from which the required spectral properties can be derived by analyser 50. In some such arrangements, for example, a chemical species to be detected gives rise to a spectral feature such as an absorption line, and the absorption line also gives rise to a small change in refractive index of the sample medium. As the laser source scans across a frequency range, the slightly different frequencies of the first and second parts are affected by such refractive index changes at different times within the frequency scan, or one part may not be affected at all, giving rise to characteristic changes in interference between the first and second parts when recombined at a detector.

The optical circuit may comprise a beam splitter arranged to combine the mutually coherent parts into a combined beam, and may further comprise transmission optics arranged to transmit either one part of the combined beam out of the spectrometer, and collection optics arranged to receive reflected portions of the transmitted light for detection at the optical detector.

In the particular example arrangement of FIG. 8 a laser source 30 and collimator 34 are used to couple infrared laser light into an optical circuit 20 implemented on substrate 10 using techniques and components as variously described above. In particular, the laser light is coupled into a first hollow waveguide portion 310 which is intersected by a quarter or half wave plate 315 for control of polarization state, before being guided to the input of an acousto-optical modulator 320 which is arranged to output $0^{th}$ and $1^{st}$ order output parts or beams 330, 332 from the input laser beam. The $0^{th}$ and $1^{st}$ order parts 330, 332 are sufficiently coherent with each other to permit subsequent interference, but the $1^{st}$ order part is slightly shifted in frequency from that of the $0^{th}$ order beam 330, with the shift corresponding to the frequency of an RF input signal to the acousto-optical modulator which may be provided for example by the controller 60.

The $0^{th}$ and $1^{st}$ order beams pass through second and third hollow waveguide portions 340, 342 respectively, and are recombined at a beamsplitter 350. To create an appropriate geometry for this recombination, each of the second and third hollow waveguides may be provided with suitable mirror components. In FIG. 8 for example, the directions of the second and third hollow waveguides are diverged to approximately opposite directions by reflection from different faces of a triangular mirror 334, and brought back together at the beam splitter 350 by planar mirrors 336, 338 provided at changes in direction of the respective hollow waveguides.

A first combination of the $0^{th}$ and $1^{st}$ order beams from the beam splitter is directed along a fourth hollow waveguide portion 344 to transmission optics 352 which direct the light as a transmitted beam 354 out of or away from the spectrometer, for example into an open space. This transmission may be towards a distant surface which could be a deliberately placed mirror or other reflector, or some other surface. Reception optics 358 then receive corresponding reflected light 356 for detection at first detector 360. A radiofrequency interference signal from interference between the $0^{th}$ and $1^{st}$ order beams at the reflector is then passed to the analyzer 50 for detection of spectral properties arising from interaction of the transmitted beam and reflected light 356 with species in or properties of the path outside the spectrometer.

A second combination of the $0^{th}$ and $1^{st}$ order beams from the beam splitter may be directed along a fifth hollow waveguide portion 346 to a second detector 362 to provide a further signal passed to the analyser 50 for use in analysis of the signal received by the first detector 360.

Figure 9:
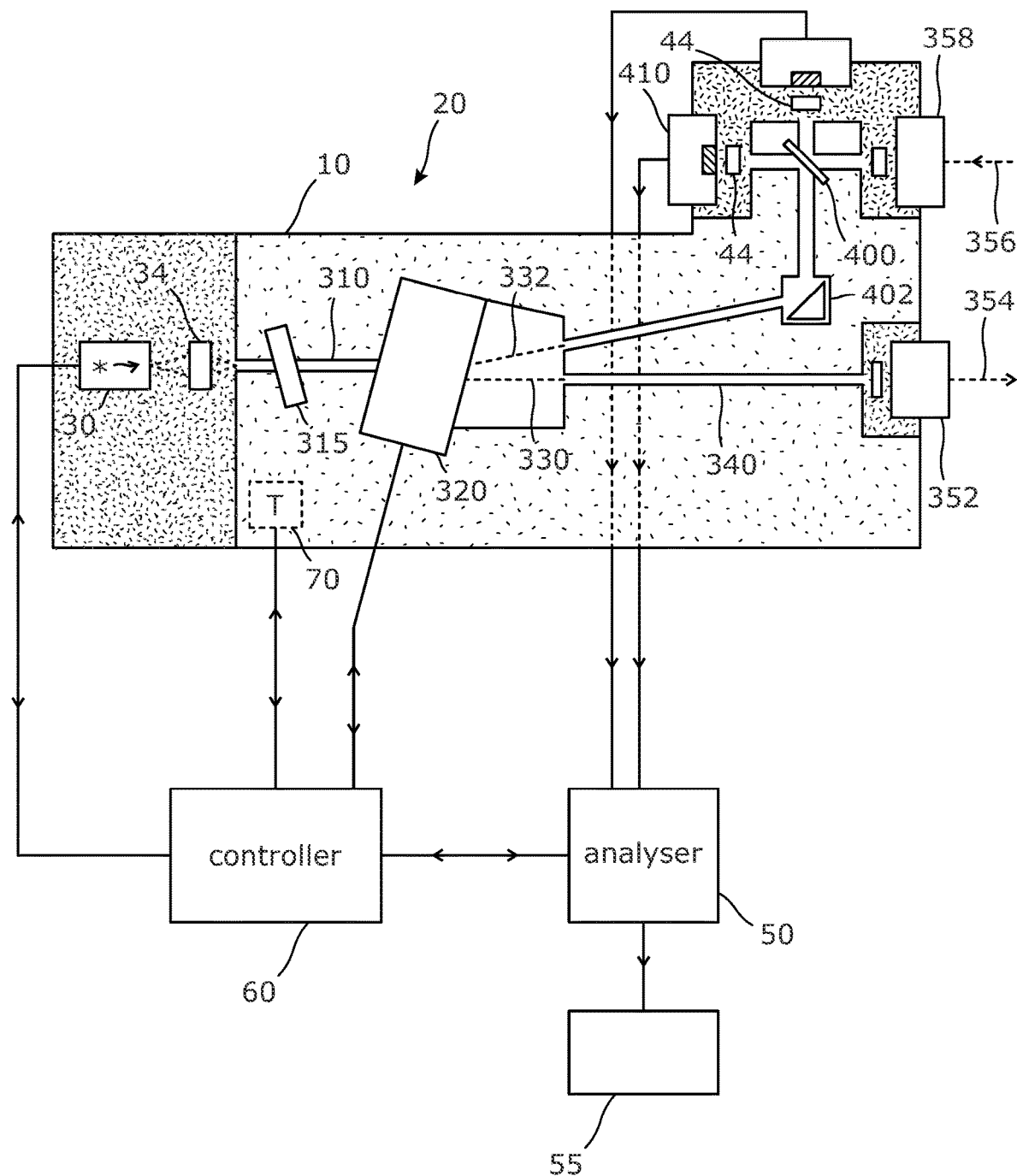
FIG. 9 illustrates in plan view of the substrate, and showing some other elements schematically, a spectroscopic heterodyne LiDAR arrangement using the general structure of FIG. 1 and optionally other features discussed in connection with FIGS. 2 to 8.

FIG. 9 shows a similar arrangement to that of FIG. 8, but in which a spectroscopic heterodyne (or coherent) LiDAR is provided. Following separation of the initial laser beam into $0^{th}$ and $1^{st}$ order parts or beams by the acousto-optical modulator 320, either of the $0^{th}$ or $1^{st}$ order beams is propagated along a second hollow waveguide 340 to transmission optics 352 which direct that part into open space as transmitted light 354, for scattering by atmospheric components such as gas species, small particles which could comprise liquid droplets, aerosols, dust, and so forth. A portion of that scattered light 356 is received back at collection optics 358 from which it is directed back into the optical circuit 20 and received at beam splitter 400.

The other of the $0^{th}$ and $1^{st}$ order beams is directed by other hollow waveguide portions of the optical circuit 20, for example including by one or more mirrors 402, to also be received at the beam splitter 400. A combination of the 0$^{th}$ and 1$^{st}$ order beams from the beam splitter is then passed along a further hollow waveguide portion of the optical circuit 20 to be received and detected at detector 410. A second combination form the beam splitter may be received at a second detector 420 if desired, to permit a more balanced detection. Signals from the one or more detectors are passed to the analyser 50 to derive spectral properties of species in the open path between the transmission and collection optics.

Although particular embodiments of the invention have been described, the person skilled in the art will appreciate that various changes and modifications can be made to the described embodiments without departing from the scope of the invention.

The invention claimed is:

1. An infrared spectrometer comprising:
a substrate;
an optical circuit comprising one or more hollow waveguides provided by elongate channels formed in the substrate, the optical circuit being arranged such that infrared light in the optical circuit acquires one or more spectral properties for detection by the spectrometer, the optical circuit comprising one or more further optical components comprising one or more of a beam splitter, a wave plate, a mirror, a lens, and an etalon;
an infrared laser source arranged to couple laser light into an input hollow waveguide portion of the optical circuit;
an optical detector arranged receive and detect infrared light from an output hollow waveguide portion of the optical circuit; and
an analyser arranged to determine said one or more spectral properties from the detected infrared light,
wherein the infrared laser source is mounted to the substrate, and the infrared spectrometer further comprises collimating optics located between the infrared laser source and the input hollow waveguide portion so as to couple the laser light into the input hollow waveguide portion.

2. The infrared spectrometer of claim 1 wherein the channels are formed in one or more surfaces of the substrate.

3. The infrared spectrometer of claim 1 wherein the channels are substantially trapezoidal or rectangular in cross section.

4. The infrared spectrometer of claim 1 wherein the channels have a width of less than 2 mm, and/or a depth of less than 2 mm.

5. The infrared spectrometer of claim 1 wherein the channels are covered by one or more cover elements.

6. The infrared spectrometer of claim 1 wherein the substrate is a block provided by an integral piece of material.

7. The infrared spectrometer of claim 1 wherein the substrate comprises at least one of: a metal; a copper alloy; a ceramic; and alumina.

8. The infrared spectrometer of claim 1 wherein the surface roughness of the walls of the channels is of an ISO roughness grade of N7 or smoother.

9. The infrared spectrometer of claim 1 further comprising a temperature controller arranged to maintain the substrate at a desired temperature.

10. The infrared spectrometer of claim 1 wherein the infrared laser source comprises at least one of: a semiconductor laser; and a swept frequency laser.

11. The infrared spectrometer of claim 1 wherein the infrared laser source is positioned adjacent to the input hollow waveguide portion of the optical circuit by location in one or more recesses in, and/or one or more protrusions from the substrate.

12. The infrared spectrometer of claim 1 wherein the collimating optics are positioned by locating the collimating optics in one or more recesses in the substrate.

13. The infrared spectrometer of claim 1 wherein the infrared laser source and collimating optics are arranged such that at least 50% the laser light couples into a single mode within the input hollow waveguide portion.

14. The infrared spectrometer of claim 1 wherein the photodetector is positioned adjacent to the output hollow waveguide portion of the optical circuit by locating using one or more recesses in, and/or one or more protrusions from, the substrate.

15. The infrared spectrometer of claim 1 wherein the one or more further optical components are positioned using one or more recesses in the substrate.

16. The infrared spectrometer of claim 1 wherein the optical circuit further comprises a sample cell arranged to receive a sample fluid, the optical circuit being arranged such that at least some of the laser light coupled into the input hollow waveguide of the optical circuit passes through the sample cell before being received at the photodetector, such that the infrared light in the optical circuit acquires from the sample fluid one or more of the spectral features for detection by the spectrometer.

17. The infrared spectrometer of claim 16 wherein the sample cell comprises a length of hollow waveguide of the optical circuit, and an optical window at each end of length of hollow waveguide for retaining the sample fluid in the sample cell.

18. The infrared spectrometer of claim 17 wherein at least some of the length of hollow waveguide is disposed in a spiral form.

19. The infrared spectrometer of claim 16 wherein the sample cell comprises a cell space formed in a surface of the substrate, walls of the cell space comprising a plurality of mirrors directing the infrared light across the cell space a plurality of times.

20. The infrared spectrometer of claim 1 arranged to direct received light received from outside the spectrometer into the optical circuit, to mix said received light with said laser light, and to detect said mixed light at the optical detector to provide heterodyne detection of spectral features of said received light.

21. The infrared spectrometer of claim 20 wherein the received light is mixed with said laser light using a beam splitter installed at a junction of said hollow waveguides.

22. The infrared spectrometer of claim 1 wherein the optical circuit is arranged to divide the laser light into at least two parts having a mutual frequency shift, the optical circuit being arranged such that at least one of the two parts acquires one or more spectral properties for detection by the spectrometer, the spectrometer being arranged such that the optical detector receives and detects interference between the two parts.

23. The infrared spectrometer of claim 22 wherein the analyser is arranged to determine said one or more spectral properties from the detected interference between the two parts of the divided laser light.

24. The infrared spectrometer of claim 22 wherein the optical circuit comprises an acousto-optical modulator arranged to divide the laser light into the two parts.

25. The infrared spectrometer of claim 22 wherein the optical circuit comprises a beam splitter arranged to combine the two parts into a combined beam before acquiring the one or more spectral properties for detection.

26. The infrared spectrometer of claim 25, further comprising transmission optics arranged to transmit the combined beam away from the spectrometer, and collection optics arranged to receive reflected portions of the transmitted light for detection at the optical detector.

27. The infrared spectrometer of claim 22 further comprising transmission optics arranged to transmit one of the two parts combined beam away from the spectrometer, and collection optics arranged to receive reflected portions of the transmitted light for detection at the optical detector.

28. The infrared spectrometer of claim 1 wherein the infrared laser source is secured to the substrate by gluing, bonding or clamping.

29. The infrared spectrometer of claim 1 wherein the optical detector is mounted to the substrate.

30. The infrared spectrometer of claim 13 wherein the single mode is the EH11 fundamental mode.

31. A method comprising:
providing an optical circuit comprising one or more hollow waveguides provided by channels formed in one or more surfaces of a substrate and one or more cover elements closing over the channels at the one or more surfaces, and one or more further optical components comprising one or more of a beam splitter, wave plate, a mirror, a lens, and an etalon, the optical circuit being arranged such that infrared light in the optical circuit acquires one or more spectral properties;
coupling infrared laser light, from an infrared laser source mounted to the substrate, into the optical circuit using collimating optics located between the infrared laser source and an input hollow waveguide portion of the optical circuit;
detecting infrared light received from the optical circuit; and
determining said one or more spectral properties from the detected infrared light.

32. The method of claim 31 wherein the one or more further optical components are fitted into apertures in the one or more surfaces of the substrate.

33. The method of claim 31 further comprising introducing a sample fluid into a sample cell comprised in the optical circuit, such that the one or more determined spectral properties are spectral properties of the sample fluid.

34. The method of claim 31 further comprising directing received light into the optical circuit, mixing said received light with said infrared laser light, detecting said mixed light received from the optical circuit, and determining spectral features of said received light from said detected mixed light.

35. The method of claim 31 wherein the spectral features comprise at least one of a position, a breadth, and an amplitude of a spectral line.

36. A method of constructing an infrared spectrometer comprising:
providing an optical circuit comprising one or more hollow waveguides provided by elongate channels formed in a surface of a substrate and one or more cover elements closing over the channels at the surface, wherein providing the optical circuit comprises forming said elongate channels in the surface of the substrate and closing over the one or more elongate channels using the one or more cover elements to form the one or more hollow waveguides for carrying infrared light;
mounting an infrared laser source to the substrate;
providing collimating optics located between the infrared laser source and an input hollow waveguide portion of the optical circuit so as to couple the laser light into the input hollow waveguide portion; and
optically coupling an optical detector to an output portion of the one or more hollow waveguides.

37. The method of claim 36 wherein the optical detector is mounted on the substrate, and the provided optical circuit further comprises one or more further optical components comprising one or more of a beam splitter, a wave plate, a mirror, a lens, and an etalon.

* * * * *